United States Patent
Lu et al.

(10) Patent No.: US 9,158,697 B2
(45) Date of Patent: Oct. 13, 2015

(54) METHOD FOR CLEANING CACHE OF PROCESSOR AND ASSOCIATED PROCESSOR

(71) Applicant: Realtek Semiconductor Corp., HsinChu (TW)

(72) Inventors: Yen-Ju Lu, Hsinchu (TW); Ching-Yeh Yu, Taipei (TW); Chen-Tung Lin, Taipei (TW); Chao-Wei Huang, New Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 339 days.

(21) Appl. No.: 13/691,841

(22) Filed: Dec. 2, 2012

(65) Prior Publication Data
US 2013/0173862 A1 Jul. 4, 2013

(30) Foreign Application Priority Data
Dec. 28, 2011 (TW) .............................. 100149208 A

(51) Int. Cl.
*G06F 12/08* (2006.01)
(52) U.S. Cl.
CPC ........ *G06F 12/0891* (2013.01); *G06F 12/0804* (2013.01)

(58) Field of Classification Search
CPC .................................................. G06F 12/0891
USPC .................................................. 711/135, 214
See application file for complete search history.

(56) References Cited

U.S. PATENT DOCUMENTS

| | | | |
|---|---|---|---|
| 6,978,357 B1 * | 12/2005 | Hacking et al. | 711/214 |
| 2011/0153952 A1 * | 6/2011 | Dixon et al. | 711/135 |

FOREIGN PATENT DOCUMENTS

| | | |
|---|---|---|
| CN | 100388187 C | 5/2008 |
| CN | 100527094 C | 8/2009 |
| CN | 101833437 A | 9/2010 |

* cited by examiner

*Primary Examiner* — Ryan Bertram
(74) *Attorney, Agent, or Firm* — Winston Hsu; Scott Margo

(57) ABSTRACT

A method for cleaning a cache of a processor includes: generating a specific command according to a request, wherein the specific command includes an operation command, a first field and a second field; obtaining an offset and a starting address according to the first field and the second field; selecting a specific segment from the cache according to the starting address and the offset; and cleaning data stored in the specific segment.

14 Claims, 4 Drawing Sheets

METHOD FOR CLEANING CACHE OF PROCESSOR AND ASSOCIATED PROCESSOR

BACKGROUND OF THE INVENTION

1. Field of the Invention

The present invention relates to a method for cleaning cache, and more particularly, to a method for cleaning cache of a specific segment of a processor.

2. Description of the Prior Art

A cache is memory whose access speed is faster than an access speed of general random access memory. Generally, the cache is made of high-speed and expensive static random access memory (SRAM) instead of the slower and cheaper dynamic random access memory (DRAM) used for system main memory. Referring to FIG. 1, because the operating speed of a central processing unit (CPU) 10 is faster than a reading speed of a main memory 12, if the CPU 10 requires to access data stored in the main memory 12, the CPU 10 needs several clock periods to complete the access operation, causing low-efficient implementation. Therefore, when the CPU 10 accesses data, a core 102 first checks whether the required data is in a cache 104. When the required data has been temporally stored in the cache 104 due to the previous operation, the CPU 10 can directly access the required data from the cache 104 instead of accessing the data from the main memory 12. Therefore, the access speed of the CPU 10 can be faster, and the operations of the CPU 10 are more efficient.

Once, the CPU cache was an advanced technique used in supercomputers, but now an instruction cache and a data cache are integrated into a microprocessor used by a computer, and such internal caches are often called L1 caches (Level 1 On-die Cache). In addition, a L2 cache, whose size is greater than L1 cache, was positioned outside the CPU such as a main board or a CPU interface, however, now the L2 cache is a standard component inside the CPU. In addition, the advanced or a workstation CPU may have a L3 cache (Level 3 On-die Cache).

The cache is used to speed up the access speed of the CPU. To fully exert functions of the cache, the cache are not only used to temporally store the data that was accessed before, but also used to move the data, which is to be used in the further, from the main memory with an instruction prediction and a data pre-access technique implemented by hardware. Therefore, the opportunity the CPU can access the required data in the cache can be increased. In addition, because the size/capacity of the cache is limited, how to clean the data stored in the cache is an important topic. In addition, the CPU may provide a write-back command or an invalidate command according to requirements of the system and software. Referring to FIG. 1, when the core 102 performs the write-back operation upon the cache 104, the data stored in the cache 104 is written back to the main memory 12; and when the core 102 performs the invalidate operation upon the cache 104, the core 102 cleans the data stored in the cache 104. Generally, the write-back command is sent with the invalidate command to make the cache be cleaned after the data is written back to the main memory 12. In addition, because the size of the early cache is very small (several kilobytes, KB), there is no need to consider how to clean only a portion of the cache, however, the current cache is expanded to be several megabytes (MB), how to clean a specific segment of the cache becomes a new topic.

In U.S. Pat. No. 6,978,357, Hacking et al. provide a solution to solve this problem. However, Hacking' method has two restrictions; one is that the selected segment must be a multiple of two, and the other one is that the size of the segment to be cleaned is fixed.

SUMMARY OF THE INVENTION

It is therefore an objective of the present invention to provide a method for cleaning a selected segment of a cache of a processor by referring a command whose format has the selected segment information.

According to one embodiment of the present invention, a method for cleaning a cache of a processor comprises: generating a specific command according to a request, wherein the specific command comprises an operation command, a first field and a second field; obtaining an offset and a starting address according to the first field and the second field; selecting a specific segment from the cache according to the starting address and the offset; and cleaning data stored in the specific segment.

According to another embodiment of the present invention, a processor comprises: a cache system comprising a cache memory; and a core, where the core is used for generating a specific command according to a request, where the specific command comprises an operation command, a first field and a second field, and the core further obtains an offset and a starting address according to the first field and the second field. The core transmits the offset and the starting address to the cache system, the cache system selects a specific segment from a cache memory according to the starting address and the offset, and the cache system cleans data stored in the specific segment.

By using the command format provided by the present invention, the starting address and the size of the segment to be cleaned can be adjusted.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
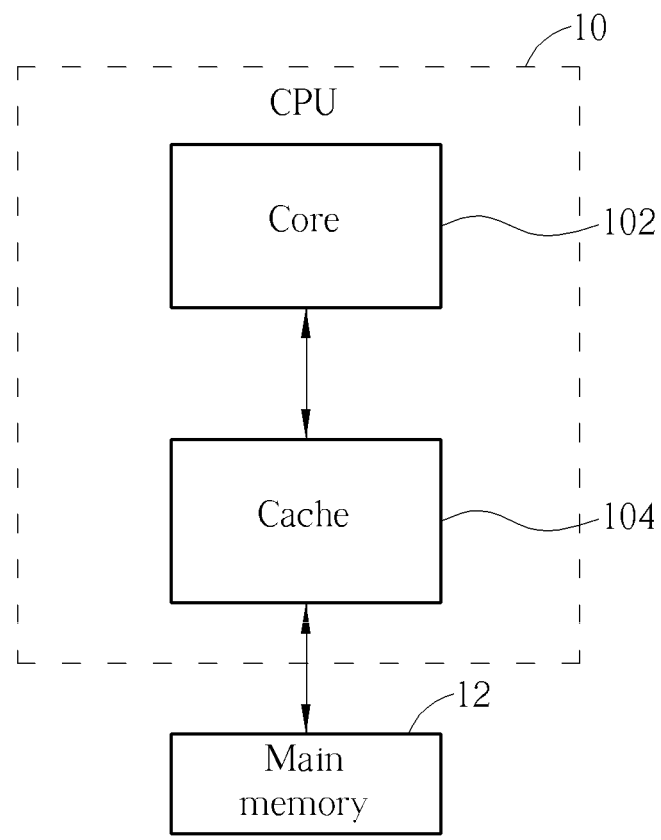
FIG. 1 is a diagram illustrating a prior art processor.
Figure 2:
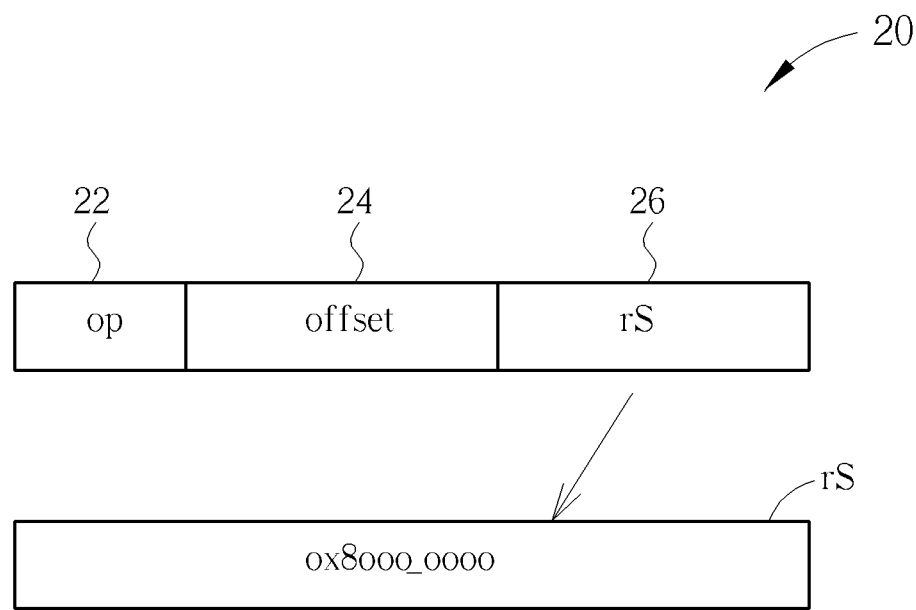
FIG. 2 shows a command format according to one embodiment of the present invention.

The present invention provides a method for cleaning a cache of a processor, and FIG. 2 shows a command format according to one embodiment of the present invention. Referring to a command 20 shown in FIG. 2, an operation (OP) field 22 includes a specific command such as "write-back", "invalidate" or "write-back and invalidate", . . . etc. The offset field 24 includes an offset. The register field 26 marked as "rS" is used to indicate to a register to mark a starting address. Generally, the processor has 32 resisters called "register file". In this embodiment, the register field 26 is used to indicate to one of the 32 registers whose value is 0x8000_0000, therefore, 0x8000_0000 serves as the starting address, and an end address is "0x8000_0000+offset", where the "offset" marked in the offset field 24 can be a quantity of offset cache lines.

For example, when the cache line size is 8 bytes, the value of the register indicated by the register field 26 is "0000" and the offset is "0001", the end address is "rS+offset=0byte+(1<<3) byte=8". That is, the starting address is "0000", and the end address is "0008". The CPU writes the data stored between the addresses "0000" and "0008" of the cache back to the main memory, or the CPU cleans the data stored between the addresses "0000" and "0008" of the cache, according to the command in the OP field 22. By changing the values of the offset field 24 and the register field 26, the size and the starting address of the selected segment can be adjusted.

Figure 3:
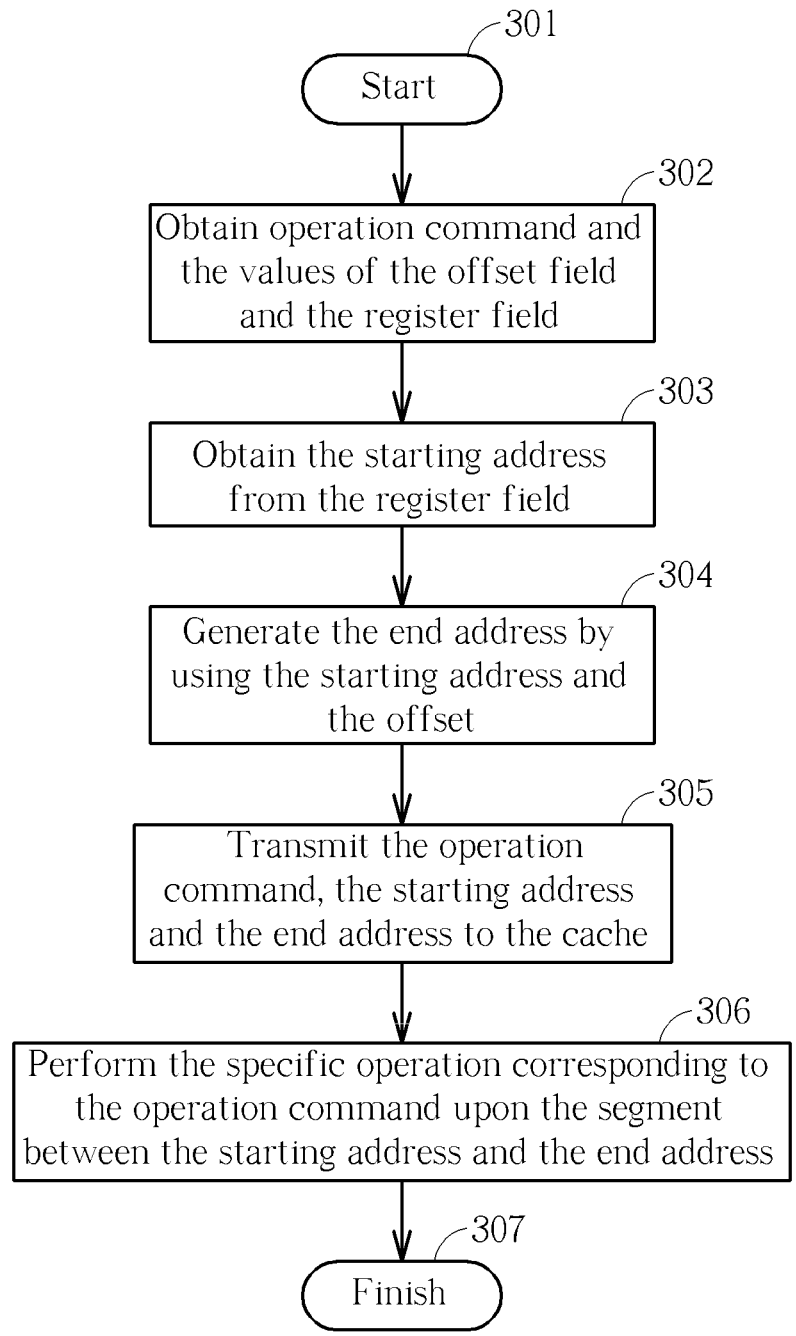
FIG. 3 is a flowchart according to one embodiment of the present invention.
Figure 4:
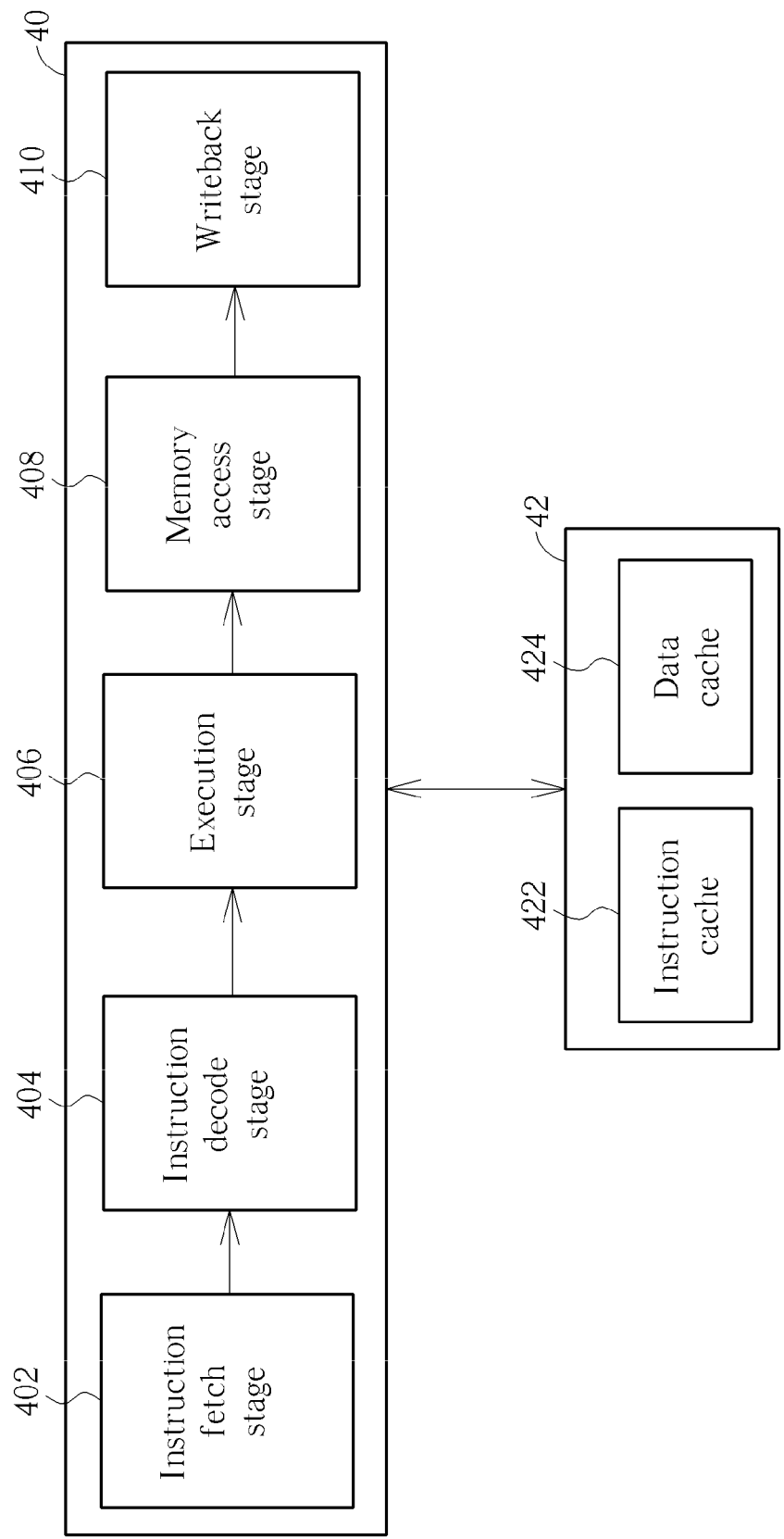
FIG. 4 is a diagram illustrating a processor of the embodiment shown in FIG. 3.

Please refer to FIG. 3 and FIG. 4 together, where FIG. 3 is a flowchart according to one embodiment of the present invention, and FIG. 4 is a diagram illustrating a processor. The processor includes a core 40 and a cache system 42, where the operations of the core 40 includes many stages such as instruction fetch (IF) stage 402, instruction decode (ID) stage 404, execution stage 406, memory access stage 408 and writeback stage 410. In this embodiment, after the Step 301 the flow starts, in Step 302, the core 40 receives a request by software in the instruction fetch stage 402, and performs decoding operation to obtain information about the offset field 24 and the register field 26. Then, in Step 303, the core 40 obtains the starting address according to the register indicated by the register field 26. In Step 304, the core 40 generates the end address by using the starting address and the offset. In Step 305, the core 40 sends the operation command, the starting address and the end address to the cache system 42. In Step 306, the cache system 42 performs the specific operation corresponding to the operation command, such as write-back, invalidate, or write-back and invalidate, upon the segment between the starting address and the end address. In Step 307, the flow is finished. In addition, cache memory of the cache system 42 includes a data cache 424 and an instruction cache 422, and the method of the present invention can be applied to both of the two caches, where the instruction cache 422 generally does not need to perform the "write-back" operation.

In the embodiment shown in FIG. 3, the core 40 provides the starting address, the offset and the end address to the cache system 42. However, in another embodiment, the core 40 merely provides the operation command, the starting address and the offset to the cache system 42, and the cache system 42 generates the end address by using the received starting address and the offset.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for cleaning a cache of a processor, wherein the cache comprises a plurality of cache lines, each cache line contains a plurality of segments, and the method comprises:

generating a specific command according to a request, wherein the specific command comprises an operation command, a first field and a second field, and the operation command comprises a "write-back" command;

obtaining an offset and a starting address according to the first field and the second field;

selecting a specific segment from the cache according to the starting address and the offset; and writing data stored in the specific segment back to a memory in response to the "write-back" command.

2. The method of claim 1, wherein the step of selecting the specific segment from the cache according to the starting address and the offset comprises:

generating an end address by using the first field and the second field; and determining the specific segment according to the starting address and the end address.

3. The method of claim 1, wherein the request is from software.

4. The method of claim 1, wherein the operation command comprises an "invalidate" command.

5. The method of claim 1, wherein the first field and the second field follows the operation command, and the second field indicates to a register.

6. The method of claim 1, wherein the step of generating the specific command according to the request comprises:

decoding the request to generate the specific command.

7. The method of claim 1, wherein the offset is a quantity of cache lines.

8. A processor, comprising:

a cache system, comprising a cache memory, wherein the cache memory comprises a plurality of cache lines, each cache line contains a plurality of segments; and a core, for generating a specific command according to a request, wherein the specific command comprises an operation command, a first field and a second field, the operation command comprises a "write-back" command, and the core further obtains an offset and a starting address according to the first field and the second field;

wherein the core transmits the offset and the starting address to the cache system, the cache system selects a specific segment from the cache memory according to the starting address and the offset, and the cache system writes data stored in the specific segment back to a memory in response to the "write-back" command.

9. The processor of claim 8, wherein the core further generates an end address according to the offset and the starting address, and transmits the starting address, the offset and the end address to the cache system.

10. The processor of claim 8, wherein the cache system generates an end address according to the offset and the starting address to determine the specific segment.

11. The processor of claim 8, wherein the request is from software.

12. The processor of claim 8, wherein the operation command comprises an "invalidate" command.

13. The processor of claim 8, further comprising a plurality of registers, wherein the first field and the second field follows the operation command, and the second field indicates to one of the registers.

14. The processor of claim 8, wherein the offset is a quantity of cache lines.

* * * * *